Aug. 7, 1951  J. P. GOMES  2,563,030
ROTARY BEET LIFTER

Filed April 16, 1948  3 Sheets-Sheet 3

INVENTOR.
BY Joseph P. Gomes
J. E. Trabucco
ATTORNEY.

Patented Aug. 7, 1951

2,563,030

UNITED STATES PATENT OFFICE 2,563,030

ROTARY BEET LIFTER

Joseph P. Gomes, Salinas, Calif.

Application April 16, 1948, Serial No. 21,355

3 Claims. (Cl. 55—106)

This invention relates to improvements in beet harvesters and more particularly to a novel drive means for the spiked pick-up wheel of a beet harvesting machine.

The beet harvesting machines of the kind now in use have a rotatable spiked wheel for picking up loosened beets imbedded in the ground. The spiked wheel operatively engages with the ground beneath and its rotation is effected by the traction afforded through the engagement of its projecting spikes with the ground or the imbedded beets. The spiked wheel is not rotated by positive drive means and as a result there is considerable slippage as the machine is propelled forwardly. With the spiked pick-up wheel failing to turn with synchronized motion as the harvesting machine advances, the beets as they are engaged and picked up by the projecting spikes become improperly aligned with the cutting knife with which they subsequently engage, and as a result some of the desirable portions of the beets are lost.

The present invention overcomes the disadvantages in the beet harvesting machines of the kind now in use by providing positive drive means synchronized with the supporting wheels of the machine for rotating the spiked pick-up wheel as the machine advances.

Other and further objects of my invention will be pointed out hereinafter, or will be indicated in the appended claims or will be obvious to one skilled in the art upon an understanding of the present disclosure. For the purpose of this application I have elected to show herein certain forms and details of a drive means for the pick-up wheel of a beet harvesting machine representative of my invention; it is to be understood, however, that the embodiment of my invention herein shown and described is for the purpose of illustration only and that therefore it is not to be regarded as exhaustive of the variations of the invention.

Figure 1:
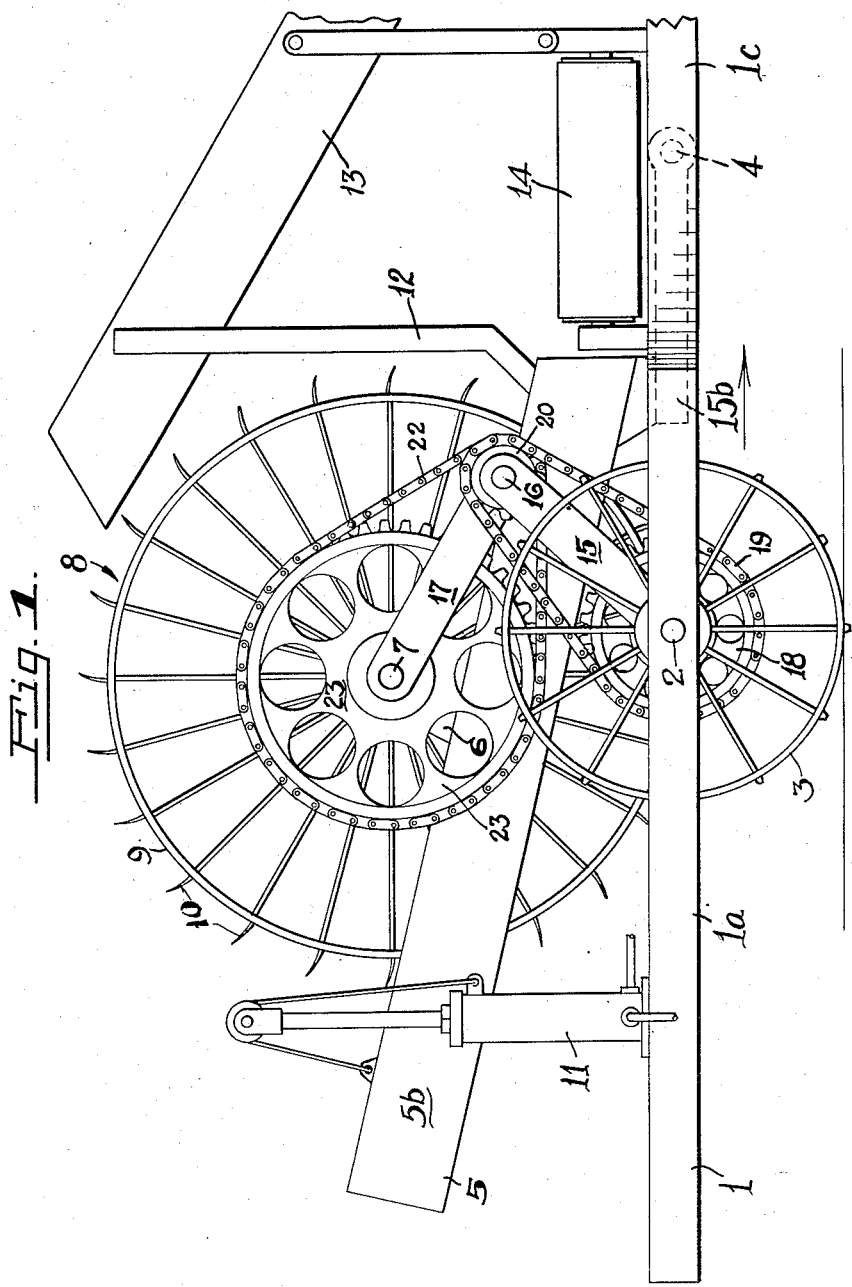
Fig. 1 is a side elevation of a beet harvester showing my improved drive means operatively connected to the spiked pick-up wheel.

Referring to the drawings, the numeral 1 designates a main supporting frame which is ordinarily towed behind a tractor or the like when the machine is in operation. The main frame comprises substantially parallel outer side members 1a, inner spaced parallel side members 1b, converging forward members 1c, a rear transverse member 1d, two forwardly disposed short transverse members 1e which are positioned between and rigidly connected to the said inner and outer side members, and a forwardly disposed transverse member 1f which is connected to the forward ends of the inner frame members 1b. The converging forward members 1c are rigidly connected to the forward ends of the inner and outer side members 1a and 1b while the rear transverse member 1d is rigidly connected to the rear ends of said inner and outer side members. Journaled on the inner and outer side members 1a and 1b of the main frame 1 are transversely aligned stub-shafts 2 and 2a, and keyed to the latter are supporting wheels 3 which engage with the ground beneath.

Pivotally mounted as at 4 on the inner side members 1b of the main supporting frame 1 is a subframe 5 having front and rear transverse frame members 5a and substantially parallel side members 5b, the said side members 5b having a pair of suitably spaced trunnions 6 secured thereon. Journaled on the trunnions is a shaft 7 to which is keyed two or more spiked pick-up wheels 8. Each pick-up wheel is of the kind commonly used on beet harvesting machines, and it comprises a circular rim 9 having a plurality of outwardly projecting annularly arranged spikes 10 projecting therefrom. The spikes 10 are preferably disposed at suitable uniform angles with respect to the rim 9, as shown on Fig. 1, thereby making it possible for them to suitably engage with the beets imbedded loosely in the ground. The beets become impaled on the spikes and upon the continued rotation of the wheel 8 they are carried upwardly and into engagement with a cutting device (not shown) which cuts the tops from their stalk portions. Since the present invention relates specifically to the drive mechanism for the spiked pick-up wheels 8 it is not believed necessary to show the usual operating parts of the beet-harvester in detail. It is to be noted however that the sub-frame 5 is selectively lowered and raised by suitable hydraulic means 11 of the well known kind to move the pick-up wheels 8 into and out of operative relationship with the ground beneath. Beet harvesters of the kind with which the present invention is used carries the usual supporting structure 12 on which is mounted knives (not shown)

for cutting the tops from the stalk portions of the beets, an inclined chute 13 for conveying the stalks to a loading point, an endless conveyor 14 for receiving the beet tops and scrapers (not shown) for disengaging the beet tops from the spikes after the completion of the cutting operation.

Figure 2:
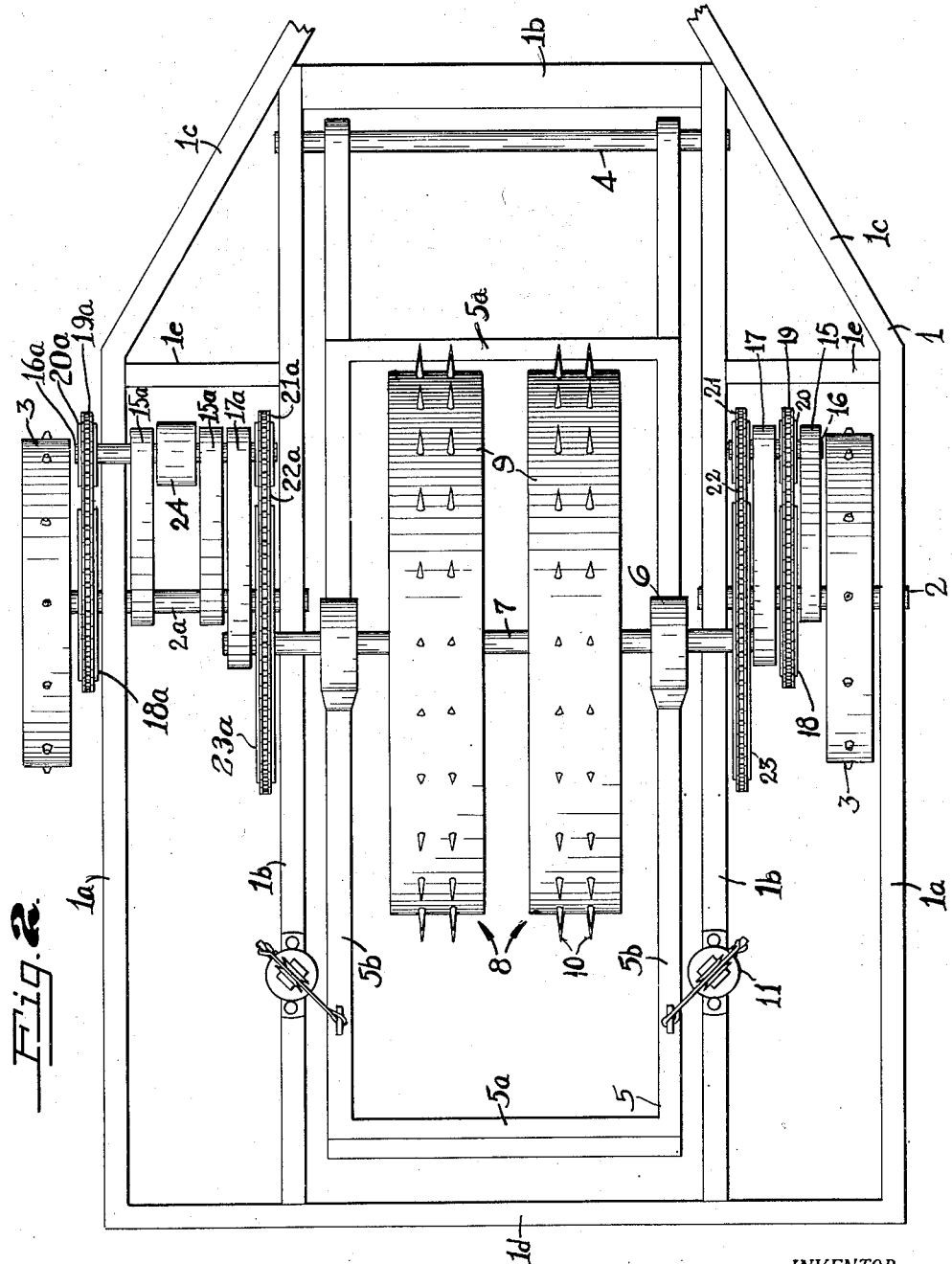
Fig. 2 is a top plan view of the machine and the drive means.
Figure 3:
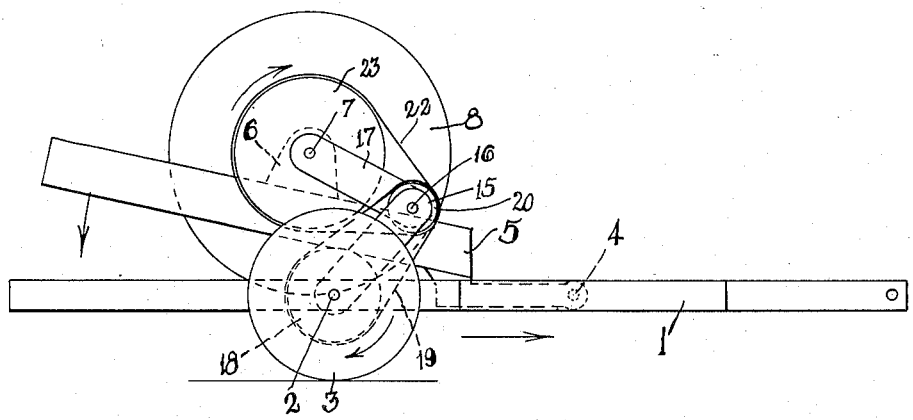
Fig. 3 is a diagrammatic view showing the position of the spiked pick-up wheel when in an inoperative position.
Figure 4:
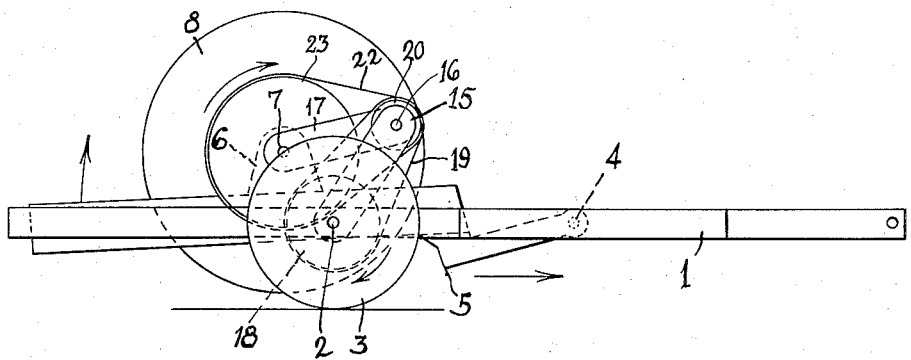
Fig. 4 is a similar view showing the operative position of the pick-up wheel.

The present invention, although capable of being embodied in various forms, comprises novel interconnecting means which maintains the spiked pick-up wheels 8 and the supporting wheels 3 in synchronized relationship. There are preferably two similar right and left transmission mechanisms mounted on opposite sides of the main frame. Describing first the right hand transmission mechanism (Fig. 2) it will be noted that pivotally connected at one of its ends to the stub-shaft 2 is a rigid member 15 which is pivotally connected at its opposite end through a rotatable stub-shaft or pin 16 to one end of a rigid member 17, the latter being pivotally connected at its opposite end to the shaft 7. Keyed to the stub-shaft 2 is a sprocket 18 which is connected by an endless chain 19 to a smaller sprocket 20 keyed to the stub-shaft 16. Also keyed to the stub-shaft 16 is a sprocket 21 which is connected by an endless chain 22 to a large sprocket 23 keyed to the shaft 7. The left hand transmission means (Fig. 2) comprises the stub-shaft 2a to which are secured adjacent ends of a pair of spaced rigid members 15a, the opposite adjacent ends of the said rigid member 15a being pivotally connected to a rotatable stub-shaft or pin 16a. The stub-shaft 16a comprises two divided portions which are connected at adjacent ends by an over drive clutch 24 of well known construction which permits one divided portion to revolve at a different speed than its other portion when one of the supporting wheels 3 rotates at a different speed than the other, as when the machine is making a turn. Loosely mounted at one of its ends on the stub-shaft or pin 16a is a rigid member 17a which is pivotally connected at its opposite end to the shaft 7. Rigidly secured to the stub-shaft 2a is a sprocket 18a which is connected by an endless chain 19a to a smaller sprocket 20a keyed to the stub-shaft 16a. Also keyed to the stub-shaft 16a is a sprocket 21a which is connected by an endless chain 22a to a large sprocket 23a keyed to the shaft 7. It is to be noted that the two sets of driving units connected to and interposed between the stub-shafts 2, 2a and the shaft 7 may embody sprockets of various sizes depending upon the desirable speed ratio between the supporting wheels 3 and the spiked pick-up wheels 8. The jack-knive structures comprising the pairs of rigid members 15 and 17 and 15a and 17a maintain the drive chains 19, 19a and 22, 22a in proper operating positions at all times irrespective of the relative positions of the stub-shafts 2 and 2a with respect to the shaft 7. Thus when the sub-frame 5 is pivotally moved in a downward direction to bring the pick-up wheels into operative positions with the ground beneath or when the sub-frame is pivotally moved in an upward direction to lift the said wheels to inoperative positions, the drive chains 19, 19a and 22, 22a will function in a satisfactory manner to cause a synchronized movement of the said sets of wheels. It is to be noted that as long as the vehicle is advancing there will be a synchronized rotation of pick-up wheels 8 with respect to the supporting wheels 3, and when the movement of the vehicle is discontinued both sets of wheels cease to rotate.

During the operation of the beet harvester the spiked pick-up wheels 8 rotate in a clockwise direction (Fig. 1) as the machine advances. The drive means connected to and interposed between the supporting wheels 3 and the pick-up wheels 8 provides an arrangement capable of overcoming any opposing force which might otherwise create a drag on the pick-up wheels and thereby cause them to fail to rotate in synchronized relation with the supporting wheels. The unbalanced load imposed by the impaled beets on the rear side of the pick-up wheels is one force which tends to cause a slippage of the said pick-up wheels. The lack of traction sometimes due to an unfirm condition of the ground beneath is another contributing factor which, in the absence of a positive drive means of the kind comprising my invention, would preclude the synchronized rotation of the supporting wheels 3 and the pick-up wheels. As previously stated a failure of the pick-up wheels 8 to rotate in synchronized relation to the supporting wheels 3 causes some of the beets to become improperly aligned on the spikes 10, and as a result a considerable portion of the stalks of those beets which are not in proper positions when engaged by the knives are lost.

The present invention, although described in association with the harvesting of beets, may be used with equal satisfaction in the harvesting of carrots, turnips and other similar vegetables.

What I claim is:

1. A vegetable harvester comprising a main supporting frame, two separated stub-shafts journaled on opposite sides of the main supporting frame, a pair of ground engaging supporting wheels keyed to the stub-shafts, a sub-frame pivotally supported at one of its ends on the main supporting frame, a drive shaft journaled on the subframe, one or more spiked pick-up wheels keyed to the drive shaft, a pair of elongated rigid members each pivoted at one end on a separate stub-shaft, a pin rotatably supported on the opposite end of each rigid member, one of said pins having two divided portions, an overdrive clutch connecting the said divided portions, a second pair of elongated rigid members pivotally connected at their opposite ends to the pins and to the shaft, chain and sprocket drive means connecting each stub-shaft and a pin, and a second chain and sprocket drive means connecting each pin and the shaft.

2. In a vegetable harvester, a main supporting frame having side members; a pair of aligned stub-shafts journaled on the side members of the main frame; a pair of ground engaging supporting wheels keyed to the stub-shafts, a sub-frame mounted for up and down pivotal movement on the main frame, a drive shaft journaled on the sub-frame and arranged in substantially parallel relation to the stub-shafts, one or more spiked pick-up wheels keyed to the drive shaft, an elongated rigid member pivotally mounted at one end on a stub-shaft, a pin rotatably supported at the opposite end of the elongated rigid member, the said pin having two divided portions, an overdrive clutch connecting the said divided portions of the pin, a second elongated rigid member pivotally connected at one end to the pin and at its opposite end to the drive shaft, drive means operatively connecting the pin and its associated stub-shaft and a second drive means connecting the pin and the drive shaft.

3. In a vegetable harvester, a main supporting frame having spaced lateral sides, a pair of stub-shafts journaled on the sides of the main frame, a pair of ground engaging supporting wheels keyed to the stub-shafts, a sub-frame mounted for up and down pivotal movement on the main frame, a drive shaft journaled on the sub-frame and arranged in substantially parallel relation to the stub-shafts, a spiked pick-up wheel keyed to the drive shaft, an elongated rigid member pivotally mounted at one end on each stub-shaft, a pin rotatably mounted on the opposite end of each elongated rigid member, one of said pins having two divided portions, an overdrive clutch connecting the said divided portions, a sprocket keyed to each stub-shaft, a second sprocket keyed to each pin, chain drive means connecting the sprocket of each stub-shaft and its associated pin, a third sprocket keyed to each pin, a fourth sprocket keyed to each end of the drive shaft, and a second chain drive means connecting each of the third sprockets and its associated fourth sprocket.

JOSEPH P. GOMES.

REFERENCES CITED

The following references are of record in the file of this patent:

UNITED STATES PATENTS

| Number | Name | Date |
|---|---|---|
| 1,121,372 | Kehr | Dec. 15, 1914 |
| 1,175,419 | Fettig | Mar. 14, 1916 |
| 2,135,621 | Millard | Nov. 8, 1938 |
| 2,405,205 | Gordon et al. | Aug. 6, 1946 |